(12) United States Patent
Lerouge

(10) Patent No.: US 12,122,542 B2
(45) Date of Patent: Oct. 22, 2024

(54) DEVICE FOR CAPTURING A FLYING CRAFT AND CAPTURE SYSTEM COMPRISING A DRONE PROVIDED WITH SUCH A DEVICE

(71) Applicant: MBDA FRANCE, Le Plessis-Robinson (FR)

(72) Inventor: Aléxis Lerouge, Le Plessis-Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 132 days.

(21) Appl. No.: 18/001,068

(22) PCT Filed: Apr. 23, 2021

(86) PCT No.: PCT/FR2021/050708
§ 371 (c)(1),
(2) Date: Dec. 7, 2022

(87) PCT Pub. No.: WO2021/250332
PCT Pub. Date: Dec. 16, 2021

(65) Prior Publication Data
US 2023/0202690 A1 Jun. 29, 2023

(30) Foreign Application Priority Data
Jun. 9, 2020 (FR) ...................................... 2005984

(51) Int. Cl.
*B64U 70/20* (2023.01)
*B64D 1/12* (2006.01)
(Continued)

(52) U.S. Cl.
CPC ............... *B64U 70/20* (2023.01); *B64D 1/12* (2013.01); *B64D 3/02* (2013.01); *B64F 1/0295* (2020.01);
(Continued)

(58) Field of Classification Search
CPC ................ B64U 70/20; B64U 2101/15; B64U 2101/16; B64F 1/295
See application file for complete search history.

(56) References Cited

U.S. PATENT DOCUMENTS

| 9,085,362 | B1 | 7/2015 | Kilian et al. |
| 10,458,757 | B1 | 10/2019 | Kearney-Fischer et al. |
| 2018/0224262 | A1 | 8/2018 | Klein |

FOREIGN PATENT DOCUMENTS

DE 102015003323 A1 9/2016

OTHER PUBLICATIONS

International Search Report for PCT/FR2021/050708 (Aug. 13, 2021).

*Primary Examiner* — Nicholas McFall
(74) *Attorney, Agent, or Firm* — Merchant & Gould P.C.

(57) ABSTRACT

A capture system (1) includes a drone (4) with a capture device (3) having a net (5) and a shank (6) configured to form a closed line. The shank (6) defines a leading face (6A) and a trailing face (6B). The net (5) has a maximum diameter that is greater than a maximum diameter of the shank (6), and is attached to the shank (6) on the side (7) of the trailing face (6B). A strip (8) attaches completely around the shank (6) outside of the net (5) on the side (7) of the trailing face (6B). Holding wires (9) attach to the shank (6) on the side (10) of the leading face (6A) for towing by the drone (4). The assembly formed by the shank (6) and the strip (8) enabling the capture device (3) to be held in an optimum position for capturing a flying craft (2).

15 Claims, 3 Drawing Sheets

(51) Int. Cl.
  *B64D 3/02* (2006.01)
  *B64F 1/02* (2006.01)
  *B64U 101/16* (2023.01)
(52) U.S. Cl.
  CPC ...... *B64U 2101/16* (2023.01); *B64U 2201/10* (2023.01)

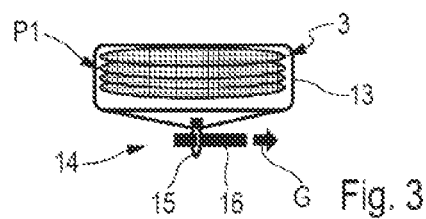
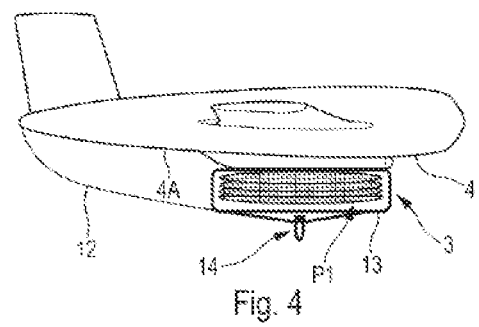
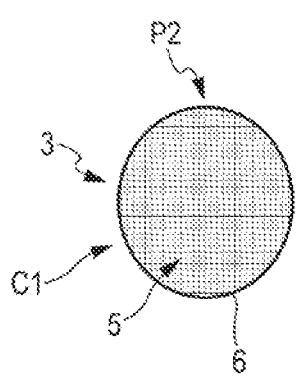
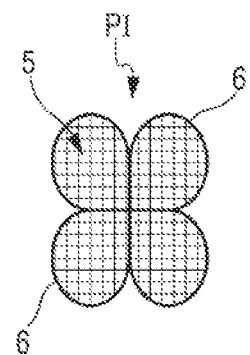
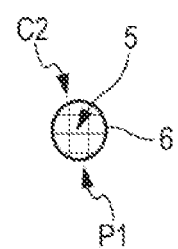
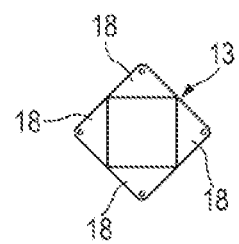
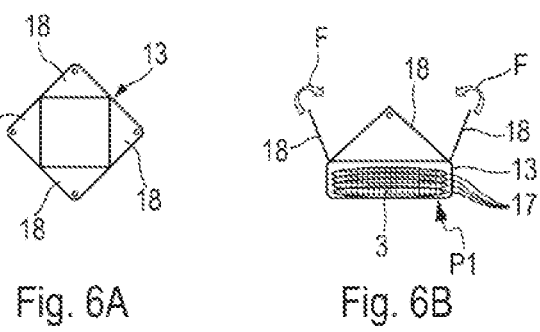

DEVICE FOR CAPTURING A FLYING CRAFT AND CAPTURE SYSTEM COMPRISING A DRONE PROVIDED WITH SUCH A DEVICE

This application is a National Stage Application of PCT/FR2021/050708, filed Apr. 23, 2021, which claims benefit of Patent Application No. 2005984, filed Jun. 9, 2020 in France, and which applications are incorporated herein by reference. To the extent appropriate, a claim of priority is made to each of the above-disclosed applications.

TECHNICAL FIELD

The present invention relates to a device for capturing a flying craft and to a capture system comprising a drone provided with such a capture device.

BACKGROUND

The present invention can be used against any type of flying craft, in particular a drone, that is to be captured.

Although not exclusively, it can be a flying craft posing a threat. Such a hostile flying craft may be equipped in particular with a weapon such as an explosive, or a chemical, biological or radiological substance. It may also be a hostile flying craft equipped with an electronic disruption device or designed to carry out a surveillance of a protected site.

As the destruction of such a flying craft can be dangerous, in particular because of the risk of dispersing the products it has boarded or falling to the ground, its capture is generally favoured with a view to its neutralisation.

Many systems are known for capturing such a flying craft.

In particular, a drone provided with a capture device allowing for capturing hostile drones is known from the document U.S. Pat. No. 9,896,221. This capture device comprises a deployable net intended to catch the hostile drone.

In a particular embodiment, the capture device is equipped with a closed frame, which is inflatable so as to be made rigid. When inflated, the closed frame has a circular shape. This frame is used to retain the net. However, in order to be held in a stable position relative to the drone, the frame is attached to the drone.

Such a stationary structure generates aerodynamic disturbances and can disrupt the flight of the drone, making it difficult to capture a hostile drone.

In another embodiment, the capture device comprises a parachute that is towed by the drone. However, the parachute falls under the drone and its positioning relative to the drone is not at all controlled. In particular, it is very sensitive to weather disturbances and in particular to wind, which makes it difficult to capture a hostile drone with such a capture device.

None of these usual solutions is therefore satisfactory.

DESCRIPTION OF THE INVENTION

The present invention is intended to remedy this disadvantage. It concerns a device for capturing a flying craft, said capture device comprising a net.

According to the invention, said capture device further comprises:

at least one rod configured to form a closed line, preferably circular, the rod defining a leading face and a trailing face, the net having a maximum diameter which is greater than a maximum diameter of closed line formed by the rod and being attached to the rod on the side of the trailing face;

a strip attached all around the rod outside the net on the side of the trailing face; and holding wires attached to the rod on the side of the leading face.

Thus, the assembly formed by the rod and the strip allows to hold the net (and more generally the whole capture device) in an optimal position for capturing a flying craft. In fact, the rod, which has a certain rigidity, allows to keep its line closed, preferably circular, which allows to facilitate the entry of the flying craft into the net through the rod, and above all the strip allows to maintain the capture device in lift, which allows to facilitate the approach of the flying craft for the purpose of its capture.

Preferably, the rod has a circular shape as a closed line. However, other geometrical shapes are of course also possible within the scope of the present invention.

Advantageously, the capture device is configured to be able to assume a folded position in which the rod is folded together with the net, the strip and the holding wires, and a deployed (stable) position in which the rod is unfolded and assumes its closed line shape.

In addition, advantageously, the holding wires meet at a junction point to which a towing wire is attached. In a particular embodiment, the holding wires and/or the towing wire are elastic.

Furthermore, advantageously, the rod has at least one of the following characteristics:

it is made of carbon fibre;
It has a diameter of between two and four millimetres;
the closed line, e.g. circular, formed by the rod has a diameter of between two and four metres.

In addition, advantageously, the strip has at least one of the following characteristics:

it is made of polyimide or polyester;
it has a width of between five and ten centimetres.

The present invention also relates to a capture system. According to the invention, said capture system comprises a capture device as described above and a drone equipped with this capture device, the capture device being towed by the drone at least during a capture step.

In a particular embodiment, the capture system comprises a bag in which the capture device is integrated in a folded position and said bag is attached to the external structure of the drone in a lower portion of the drone.

Advantageously, the capture system comprises controllable opening means configured to be able to open the bag so as to allow the exit of the capture device via the unfolding of the rod. In a particular embodiment, the opening means comprises a controllable actuation member configured to remove a spindle to allow holding a plurality of portions of the bag together and thereby release the portions held together.

Advantageously, the capture system also comprises a controllable separation means configured to separate the capture device from the drone.

The present invention further relates to a method for capturing a flying craft using a capture system as described above.

According to the invention, said capture method comprises at least the following steps:

a deployment step consisting of deploying the capture device from a folded position, the capture device remaining attached to and being towed by the drone in its deployed position; and a capture step consisting in making the drone fly so as to bring the capture device which it is towing, into a position such that the flying craft to be captured passes through the rod of said capture device by its leading face and is retained in the net of said capture device.

Advantageously, the capture method also comprises a release step consisting of releasing the capture device from the drone in order to release the captured flying craft into said capture device.

Furthermore, in a preferred embodiment, the capture method further comprises, between the capture step and the release step, a distancing step consisting of making the drone fly so as to bring the flying craft captured into the capture device above a given geographical area, generally a safe area, where the release step is implemented.

BRIEF DESCRIPTION OF FIGURES

FIG. 3 illustrates schematically a bag shown in transparency, which is equipped with a capture device.

FIG. 4 shows schematically a drone equipped with a capture device arranged in a bag attached under the drone.

FIGS. 5A, 5B and 5C illustrate different successive steps in the folding of a capture device.

FIGS. 6A and 6B illustrate two steps for placing a capture device in a bag.

DETAILED DESCRIPTION

Figure 1:
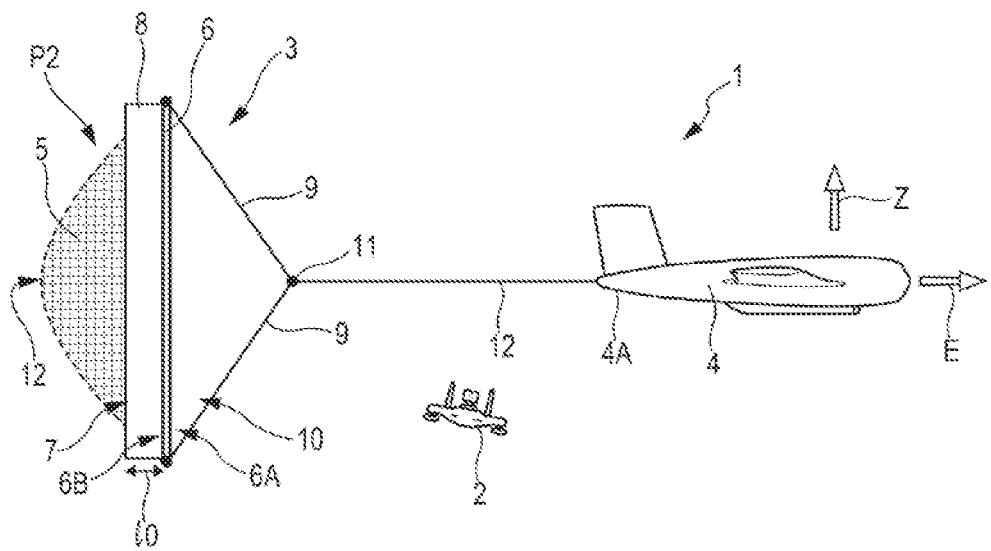
FIG. 1 shows schematically a particular embodiment of a capture system, during a phase (or step) of capturing a flying craft.

The capture system 1, allowing to illustrate the invention and shown schematically in FIG. 1 in a particular embodiment, is intended to capture a flying craft 2, in particular a hostile flying craft.

The flying craft 2 may correspond in particular to a flying craft, for example a drone, presenting a threat, and liable in particular to be equipped with a weapon such as an explosive, or a chemical, biological or radiological substance. It may also be a hostile flying craft equipped with an electronic disruption device or designed to carry out a surveillance of a protected site.

For this purpose, the capture system 1 comprises a capture device 3 and a drone 4 which is equipped with this capture device 3. The capture device 3 is towed by the drone 4 in a capture step (or phase) shown in FIG. 1, with the drone 4 flying in the orientation shown by an arrow E.

In the following, the term "front" is defined in the orientation of the arrow E and the term "rear" is defined in the opposite orientation to the arrow E. In addition, the terms "lower" and "bottom" are defined in the opposite orientation to that of a vertical arrow Z (FIG. 1) pointing from the earth to the sky.

The drone 4 comprises all the usual means (engine, bearing surfaces, etc.) allowing said drone 4 to fly and to carry out the manoeuvres allowing to capture the flying craft 2. The drone 4 can be remotely controlled or be completely autonomous in flight, and it comprises usual means to implement these functions. All these common means boarded on the drone 4 are known and are not described further in this description.

Figure 2:
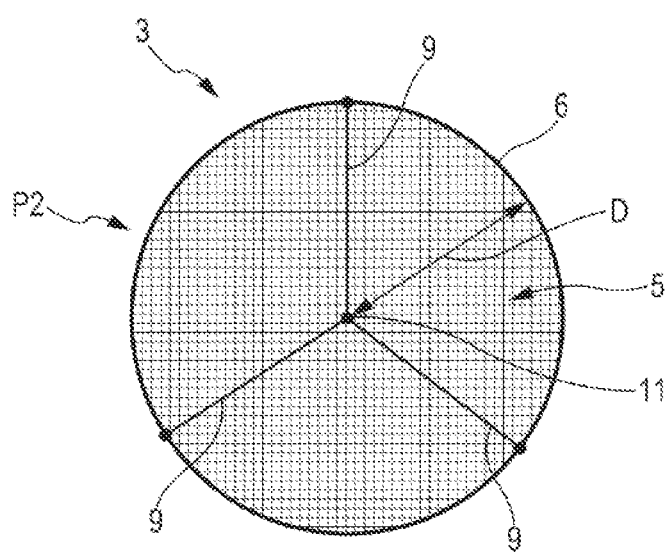
FIG. 2 is a schematic plan view of a capture device.

The capture device 3 comprises, as shown in FIGS. 1 and 2:
- a deployable net 5;
- a rod 6 configured to form a closed line. The rod 6 defines a leading face 6A and a trailing face 6B. The net 5 has a maximum diameter that is larger than a maximum diameter of the rod 6 and is attached to the rod 6 on the side 7 of the trailing face 6B;
- a strip 8 attached all around the rod 6 outside the net 5, on the side 7 of the trailing face 6B; and
- holding wires 9 attached to the rod 5 on the side 10 of the leading face 6A.

In the preferred embodiment shown in FIGS. 1 and 2, the rod 6 has a circular shape as a closed line. However, other geometrical shapes, in particular other curved shapes (elliptical, oval, any shape) or parallelogram shapes, are of course possible within the scope of the present invention.

The rod 6 is rigid. This rigidity allows to keep the closed shape, in particular circular, intended to allow the flying craft 2 to enter the capture device 3 through said rod 6.

The rod 6 may be formed from a single part or from a plurality of rod stretches joined together to form said rod 6. The diameter D (FIG. 2) of the closed line (or arch) formed by the rod 6 is optimised. It is sufficiently large to allow a flying craft 2 to enter the capture device 3, through said rod 6, but not too large to avoid a structural instability and to allow the rod 6 to be fold in particular to allow it to be inserted into a bag as described below. In one particular embodiment, the rod 6 has a diameter D of between two and four metres.

In addition, the rod 6 is made of a material that is sufficiently flexible so that it can be folded, yet rigid enough to keep the closed shape intended for the flying craft 2 to enter the capture device 3. In one particular embodiment, the rod 6 is made of carbon fibre and/or is two to four millimetres thick.

As mentioned above, the net 5 has a maximum diameter that is greater than a maximum diameter of the rod 6 when unfolded.

The "maximum diameter" of an element means the maximum distance between two end points of the element, regardless of the shape of the element. Of course, in the case of a circular element, as in the example of the rod 6 shown in FIG. 2, this maximum diameter simply corresponds to the diameter D of the corresponding circle.

Figure 10:
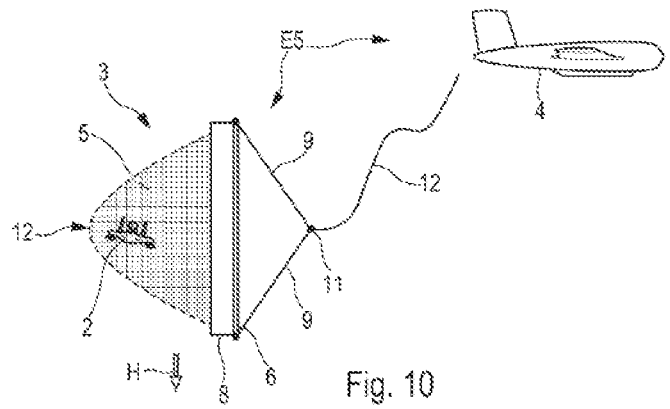
FIG. 10 schematically illustrates a release step for a captured flying craft from a capture device.

The diameter of the net 5 is larger than the diameter D of the rod 6 to allow the net 5 to float behind the rod 6 (on the side 7 of the trailing edge 6B) during the flight of the drone 4 as shown in FIG. 1, and to be able to receive the flying craft 2 (when captured) between the rod 6 and the rear edge 12 of the net 5 as shown in FIG. 10.

The net 5 can be made of any usual material and has meshes suitable for retaining the flying craft 2. These meshes can take different shapes, for example square, rectangular, etc.

Furthermore, the strip 8 is intended to allow the capture device 3 to have a certain lift and to hold it in the air when it is towed by the drone 4, regardless of the flight speed of the latter, even at a low speed.

In a particular embodiment, the strip 8 is made of a material commonly used to manufacture a parachute sail, for example polyamide or polyester.

In addition, the strip 8 has an optimised width 10 (FIG. 1). This width 10 is, on the one hand, sufficiently large to generate the lift necessary to hold the capture device 3 in the air and, on the other hand, sufficiently small to avoid the appearance of instabilities and aerodynamic disturbances likely, in particular, to generate significant drag that could disturb the flight of the drone 4. In a preferred embodiment, the strip 8 has a width 10 of between five and ten centimetres.

Furthermore, the capture device 3 has a number of holding wires 9, for example three or six holding wires 9, which are evenly distributed around the periphery of the rod 6, in particular to achieve an even distribution of tensile forces.

In addition, the holding wires 9 meet at a junction point 11 to which a towing wire 12 is attached. This towing wire 12 is connected to the drone 4 so that the drone 4 tows the capture device 3, as shown in FIG. 1.

The towing wire 12 may be attached to the rear of the drone 4, as shown in FIG. 1, or to another portion of the fuselage 4A of the drone 4, located towards the rear and preferably downwards.

In a particular embodiment, the holding wires 9 and/or the towing wire 12 are made of an elastic material. This elasticity of the holding wires 9 and/or of the towing wire 12 allows to dampen the shock generated when the capture device 3 is deployed as described below, as well as the shock generated when the flying craft 2 is captured in the net 5.

The capture device 3, as described above, is configured to be able to take two different successive positions:
 a folded position P1 in which the rod 6 is folded (under mechanical stress), together with the net 5, the strip 8 and the holding wires 9, as shown in FIGS. 3 and 4; and
 a stable deployed position P2 in which the rod 6 is unfolded and assumes its closed line shape, as shown in FIGS. 1 and 2.

In a particular embodiment, the capture system 1 comprises a bag 13 in which the capture device 3 is integrated in the folded position P1 as shown in FIG. 3.

The bag 13 is attached to the external structure (fuselage 4A) of the drone 4 in a lower portion of the drone 4, as shown in particular in FIG. 4. Preferably, the bag 13 is attached to the underside of the drone 4. This placement in the bag 13 allows to reduce the drag generated by the capture device 3 and thus allows the drone 4 to keep its manoeuvrability.

FIGS. 5A to 5C illustrate an example of folding the rod 6 to allow the capture device 3 to be brought from the deployed position P2 shown in FIG. 5A, to the folded position P1 shown in FIG. 5C. To do this, in this example, the rod 6 is first folded from the deployed position P2 (FIG. 5A) into an intermediate position PI (FIG. 5B) with four circles. Then it is folded from the intermediate position PI into the folded position P1 (FIG. 5C).

In the deployed position P2, the rod 6 has a circle C1. The folding example shown in FIGS. 5A to 5C allows for a circle C2 with four superimposed portions 17, as shown in FIGS. 3 and 6B, which is sufficiently reduced to allow the capture device to be placed in the bag 13. In this folded position P1, the folding of the rod 6 is such that, due to the material used which has a certain elasticity, it generates a mechanical tension tending to unfold the rod 6 so that it returns to its stable unfolded position of FIG. 2.

Of course, other types of folding are conceivable within the scope of the present invention (with a different number of superimposed portions), depending in particular on the diameter of the rod 6.

When folded, the capture device 3 is mounted in the bag 13. FIG. 6A shows an example of a bag 13 that can accommodate the capture device 3 in its folded position P1. When the capture device 3 is in place in the bag 13, the edges 18 of the bag 13 are folded down as shown by arrows F in FIG. 6B, and are held by closure means (not shown).

The capture system 1 also comprises controllable opening means (not shown) configured to open the bag 13 to allow the exit of the capture device 3 by the unfolding of the rod 6.

In a particular embodiment, shown in FIG. 3, the bag 13 is provided with closure means 14 comprising a spindle 16 allowing for holding together a plurality of portions 18 of the bag 13 via an annulus 15. In this particular embodiment the opening means comprises a controllable actuation member (not shown). This actuation member is configured to remove the spindle 16 as illustrated by an arrow G in FIG. 3, and thereby release the portions held together to allow the bag 13 to be opened.

The mechanical tension of the rod 6, due to the folding of the rod 6, then allows the bag 13 to be opened completely.

Furthermore, the capture system 1 also comprises a controllable separation means (not shown) configured to be able to separate the capture device 3 from the drone 4, by removing the attachment of the towing wire 12 from the drone 4.

The opening means and the separation means can be controlled by means of a control signal sent remotely by an operator, or a control signal generated automatically in particular according to the position of the drone 4.

The capture system 1, as described above, is configured to be able to implement a capture method M for a flying craft 2.

Figure 7:
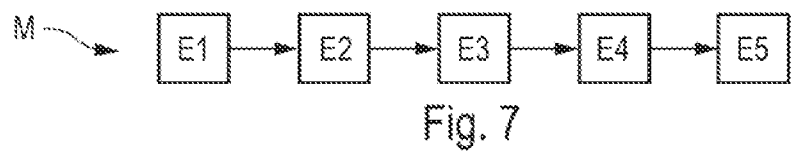
FIG. 7 is a block diagram of a capture method implemented by a capture system.

In a preferred embodiment, this capture method M comprises the steps E1 to E5 shown in FIG. 7.

In a particular implementation, when a threat generated by a flying craft 2 is detected, the drone 4 equipped with the capture device 3 is launched, for example from a launch platform. The drone 4 flies, for example autonomously or by being remotely controlled, towards the flying craft 2 during an initial approach step E1. When it arrives in the vicinity of the flying craft 2, for example 15 metres from the flying craft 2, the capture device 3 which is installed in the bag 13 is deployed in a deployment step E2.

The deployment step E2 consists of deploying the capture device 3 from the folded position P1.

Figures 8A, 8B, 8C, 8D:
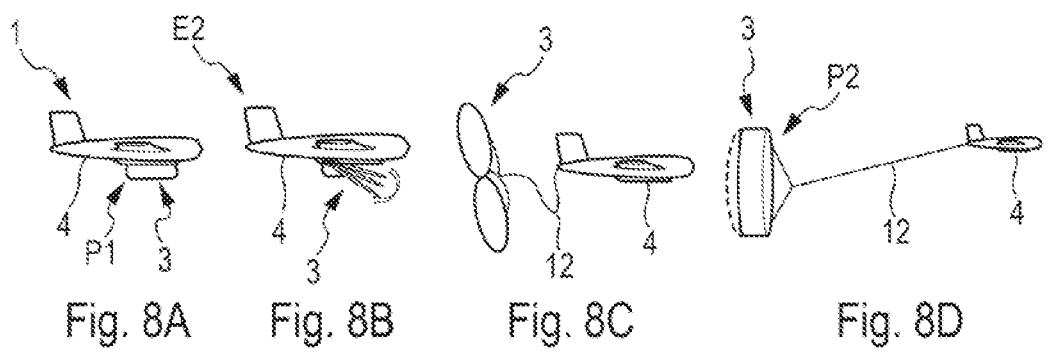
FIGS. 8A, 8B, 8C and 8D illustrate different successive steps in the deployment of a capture device during a flight of the drone.

FIGS. 8A to 8D show different successive instants of the deployment step E2. In FIG. 8A, the capture device 3 is installed in the bag 13 which is attached under the drone 4 and closed. FIG. 8B shows the opening of the bag 13 (by means of the controlled opening means) and the progressive exit of the capture device 3 from the bag 13, downwards, under the mechanical action of the rod 6 which tends to unfold. The capture device 3 is gradually deployed (FIG. 8C) to the deployed position P2 in FIG. 8D. It remains attached to the drone 4 by means of the towing wire 12. In addition, the capture device 3 is held in the air behind the drone 4 by the strip 8 and the displacement towards the front of the drone 4.

At the end of this deployment step E2, the capture device 3 thus remains attached to the drone 4 by means of the towing wire 12 and is towed by the drone 4.

A flight manoeuvre is then carried out by the drone 4 to implement a subsequent capture step E3.

Figure 9:
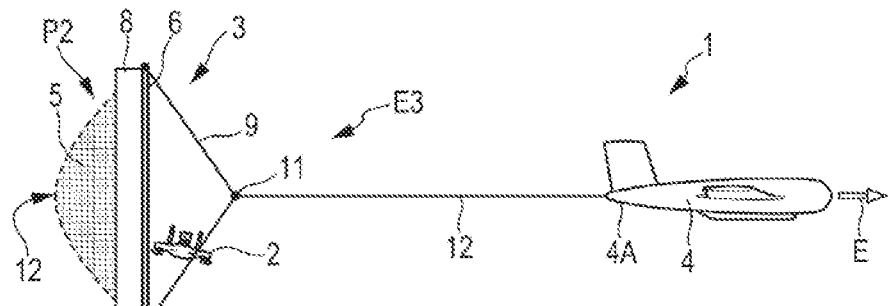
FIG. 9 shows a capture step for a flying craft by a capture system identical to that shown in FIG. 1.

The capture step E3 consists of catching the flying craft 2 in the net 5 of the capture device 3. To do this, the drone 4 is flown in such a way as to bring the capture device 3 which it is towing, into a position such that the flying craft 2 to be captured passes through the rod 6 of said capture device 3 by its leading face 6A, as it is doing in the example of FIG. 9, and is retained in the net 5 of the capture device 3, in the rear portion 12 of the net 5. After being captured in this way, the drone 2 remains trapped in the net 5.

Furthermore, in a preferred embodiment, the capture method M further comprises a distancing step E4 implemented after the capture step E3. This distancing step E4 consists of flying the drone 4 in such a way as to move the flying craft 2 away from the geographical area overflown and bring the flying craft 2 captured in the capture device 3 above a given geographical area. When it arrives over this given geographical area, a release step E5 is implemented.

The geographical area that is overflown at the time of the capture may be a sensitive area, for example an area where people are present, which should be avoided. The geographical area is preferably a safe geographical area where there is no risk of collateral damage.

The release step E5 consists of releasing the capture device 3 from the drone 4, using the separation means which is controlled to detach the towing wire 12 from the drone 4 as shown in FIG. 10. This separation of the assembly formed by the flying craft 2 and the capture device 3 allows the captured flying craft 2 to be released into the capture device 3. The captured flying craft 2 can no longer fly and falls to the ground as shown by an arrow H in FIG. 10, where it can be recovered or destroyed if not already recovered. The drone 4 can continue to fly and move in a safe area.

Of course, the release step E5 can also be implemented directly after the capture step E3, for example if the drone 4 is over a safe area during the capture.

The invention claimed is:

1. A device for capturing a flying craft, said capture device comprising:
   a net,
   at least one rod configured to form a closed line, the rod defining a leading face and a trailing face, the net having a maximum diameter which is greater than a maximum diameter of closed line formed by the rod, the net being attached to the rod on a side of the trailing face;
   a strip attached around the rod outside the net on the side of the trailing face; and
   holding wires attached to the rod on a side of the leading face.

2. The device according to claim 1,
   wherein the rod has a circular shape as a closed line.

3. The device according to claim 1,
   wherein the device is configured to assume a folded position in which the rod is folded together with the net, the strip, and the holding wires and a deployed position in which the rod is unfolded and assumes a shape as a closed line.

4. The device according to claim 1,
   wherein the holding wires meet at a junction point to which a towing wire is attached.

5. The device according to claim 4,
   wherein the holding wires and/or the towing wire are elastic.

6. The device according to claim 1,
   wherein the rod has at least one of the following characteristics:
   it is made of carbon fibre;
   the rod has a diameter of between two and four millimetres;
   the closed line formed by the rod has a diameter of between two and four metres.

7. The device according to claim 1,
   wherein the strip has at least one of the following characteristics:
   the strip is made of polyamide or polyester;
   the strip has a width of between five and ten centimetres.

8. A system for capturing a flying craft,
   comprising a capture device according to claim 1 and a drone equipped with this capture device, the capture device being towed by the drone during a capture step.

9. The system according to claim 8,
   comprising a bag in which the capture device is integrated in a folded position, and wherein said bag is attached to an external structure of the drone in a lower portion of the drone.

10. The system according to claim 9,
    comprising controllable opening means configured to open the bag in such a way as to allow exit of the capture device via the unfolding of the rod.

11. The system according to claim 10,
    wherein the opening means comprise a controllable actuation member configured to remove a spindle for holding together a plurality of portions of the bag and thereby release the portions held together.

12. The system according to claim 8,
    comprising controllable separation means configured to separate the capture device from the drone.

13. A method for capturing a flying craft using a capture system as specified in claim 8,
    comprising at least the following steps:
    a deployment step of deploying the capture device from a folded position, the capture device remaining attached to and being towed by the drone; and
    a capture step of making the drone fly to bring the capture device which the drone is towing, into a position such that the flying craft to be captured passes through the rod of said capture device by its a leading face and is retained in the net of said capture device.

14. The method according to claim 13,
    further comprising a release step of releasing the capture device from the drone to release the captured flying craft into said capture device.

15. The method according to claim 14,
    further comprising between the capture step and the release step, a distancing step of making the drone fly to bring the flying craft captured in the capture device, above a given geographical area where the release step is implemented.

* * * * *